April 19, 1932.  A. F. ERICHSEN  1,854,582
CLIPPER AND RETAINER
Filed May 8, 1930
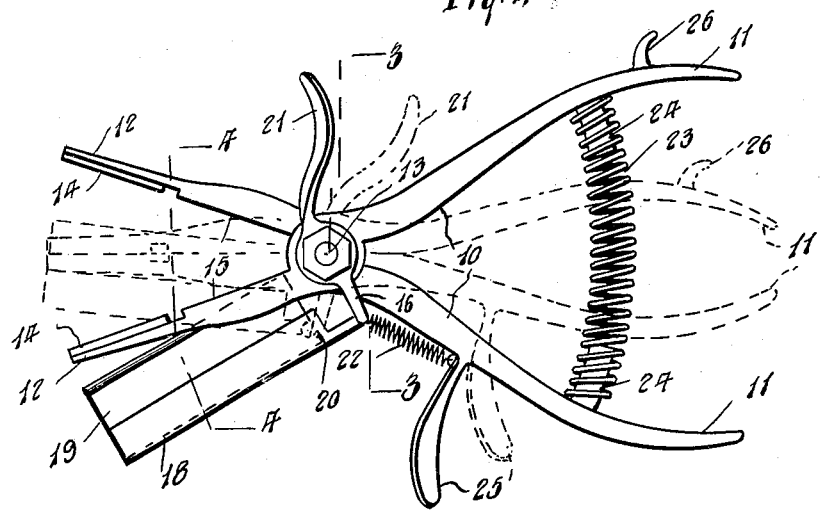
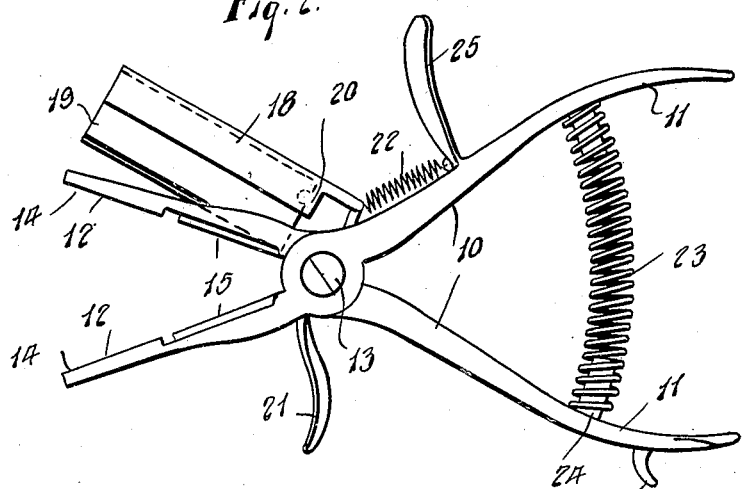
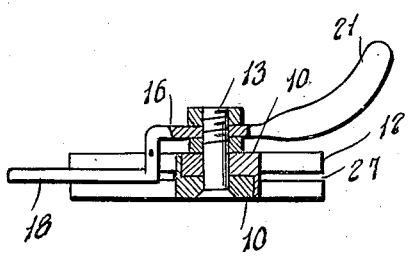
Inventor
A. F. Erichsen,
By L. F. Rudolph Jr.
Attorney Patented Apr. 19, 1932

1,854,582

UNITED STATES PATENT OFFICE

ALFRED F. ERICHSEN, OF LOWELL, WASHINGTON

CLIPPER AND RETAINER

Application filed May 8, 1930. Serial No. 450,809.

This invention relates to a clipper adapted for the cutting and retention of various fruits, flowers and the like.

A particular object is to provide a novel construction adapted for use in one hand and for either right or left hand use.

Another object is to provide a novel construction wherein the stem is effectively gripped and held by the clipper while the portion from which it is severed remains free.

Another object is to provide a novel construction having a cutter coacting with the jaws.

Still further it is aimed to provide a construction which will enable the use of discarded razor blades as the cutting element.

Various additional objects and advantages will become apparent from a consideration of the description following taken in connection with accompanying drawings illustrating an operative embodiment.

In said drawings:

Figure 1 is a view in elevation of the clipper, the same being shown open in full lines and closed in dotted lines, Figure 2 is a view similar to Figure 1 but taken from the reverse side thereof, Figure 3 is a cross sectional view taken on the line 3—3 of Figure 1, and Figure 4 is a cross sectional view taken on the line 4—4 of Figure 1.

Referring specifically to the drawings, 10 designates two levers adapted for relative movement having handles at 11 and jaws at 12, the levers being pivotally connected together between the jaws and handles by a removable bolt 13. The facing surfaces of the jaws 12 are adapted to contact in order to grip the stems of fruit, flowers or the like. Portions of such surfaces however are cut away as at 14 from one side thereof while other portions from the opposite side are cut away as at 15.

Also pivoted on the bolt 13 is a cutter lever 16. This lever may be of any desired form, preferably having a U-shaped holder portion 18 adapted to detachably clasp a cutter 19, which may abut a closed inner end 20 of the holder. Such blade 19 may be discarded razor blades although no limitation in this connection is to be implied. The lever 16 also includes a thumb piece 21 and a contractile spring 22 is connected to the lever 16 and to one of the levers 10, to normally maintain the blade retracted as shown in Figures 1 and 2.

The levers 10 are normally held with their jaws 12 spread apart through the medium of an expansive coil spring 23 into opposite ends of which lugs 24 on the handles 11 project.

A finger piece 25 is also preferably provided on one of the handles 11 while a finger hook 26 is disposed on the other handle 11.

In the use of the device, it is manipulated in one hand, the stem being received between the jaws 12 and the handles 11 then pressed together to grip the stem, after which the lug 21 is moved by a finger of the same hand gripping the device which causes the blade 19 to move through lateral slots 27 in the jaws 12, thus severing the stem. That portion of the stem which is between the slot 14, being on the bush, vine or plant, is not engaged, due to the clearance provided while the stem of the severed fruit or the like is gripped in line therewith. When the device is used in the other hand and reversed the portion 15 will not grip the stem while the portions in line therewith will grip the severed fruit, flower or the like.

Various changes may be resorted to provided they fall within the spirit and scope of the invention.

I claim as my invention:—

1. A clipper and retainer comprising a pair of levers, said levers having jaws, said jaws having portions adapted to grip an article and being cut away in transverse alinement therewith to the opposite sides of the jaws, said jaws also having portions spaced from the first mentioned portions and adapted to grip an article and being cut away transversely therefrom to the opposite side of the jaws, the latter cut away portions being on the opposite side of the jaws to the first mentioned cut away portions, and cutting means movable across the jaws.

2. A clipper and retainer comprising a pair of levers, said levers having gripping jaws, each jaw at its gripping face having longitudinally spaced apart gripping portions, the said portions of each jaw being located in planes one above the other, said faces being cut away from said portions to the opposite sides of the jaw, the corresponding gripping portions of the jaws being opposite each other, and cutting means carried by the levers and movable across the jaws, whereby an upstanding or hanging article may be cut without turning the device over.

3. A clipper and retainer comprising a pair of levers, said levers having gripping jaws, each jaw at its gripping face having longitudinally spaced apart gripping portions, the said portions of each jaw being located in planes one above the other, said faces being cut away from said portions to the opposite sides of the jaw, the corresponding gripping portions of the jaws being opposite each other, cutting means carried by the levers and movable across the jaws, whereby an upstanding or hanging article may be cut without turning the device over, said jaws being transversely slotted for movement of said cutting means therethrough.

In testimony whereof I affix my signature.

ALFRED F. ERICHSEN.